United States Patent
Dürr

[15] 3,641,888
[45] Feb. 15, 1972

[54] PHOTOGRAPHIC APPARATUS WITH AUTOMATIC EXPOSURE CONTROL MEANS

[72] Inventor: Dürr, Helmut Munich, Germany

[73] Assignee: AGFA-Gevaert Aktiengesellschaft, Leverkusen, Germany

[22] Filed: Mar. 13, 1970

[21] Appl. No.: 19,284

[30] Foreign Application Priority Data

Feb. 14, 1969 Germany..................P 19 14 945.2

[52] U.S. Cl............................95/10 CE, 95/53 EB, 95/64 R
[51] Int. Cl. .......................................................G03b 7/08
[58] Field of Search..................95/10 C, 53 E, 64 R, 10 CE, 95/10 CD, 10 CT, 53 EB

[56] References Cited

UNITED STATES PATENTS

| | | | |
|---|---|---|---|
| 3,411,421 | 11/1968 | Bestenreiner | 95/10 C |
| 3,418,479 | 12/1968 | Schmitt | 95/10 C X |
| 3,429,244 | 2/1969 | Von Wasielewski | 95/10 C |
| 3,433,140 | 3/1969 | Wick et al. | 95/10 C |
| 3,439,595 | 4/1969 | Kiper | 95/10 C |
| 3,464,332 | 9/1969 | Davison et al. | 95/10 C |

*Primary Examiner*—Joseph F. Peters, Jr.
*Attorney*—Michael S. Striker

[57] ABSTRACT

A photographic camera wherein the diaphragm respectively defines a smaller and a larger aperture at a higher and at a lower range of scene brightnesses. Depression of the camera release causes an electronic control circuit to energize a relay which is connected to the output of the control circuit and closes the shutter with a delay determined by a timer connected to the input of the control circuit and including a photosensitive receiver and a capacitor. The aperture size is automatically increased in response to energization of an electromagnet, which is in parallel with the relay, when the scene brightness is within the lower range. A signal lamp lights up when the user begins to depress the camera release at a scene brightness which is below the lower range and at which the exposure cannot be made with the camera held by hand.

12 Claims, 1 Drawing Figure

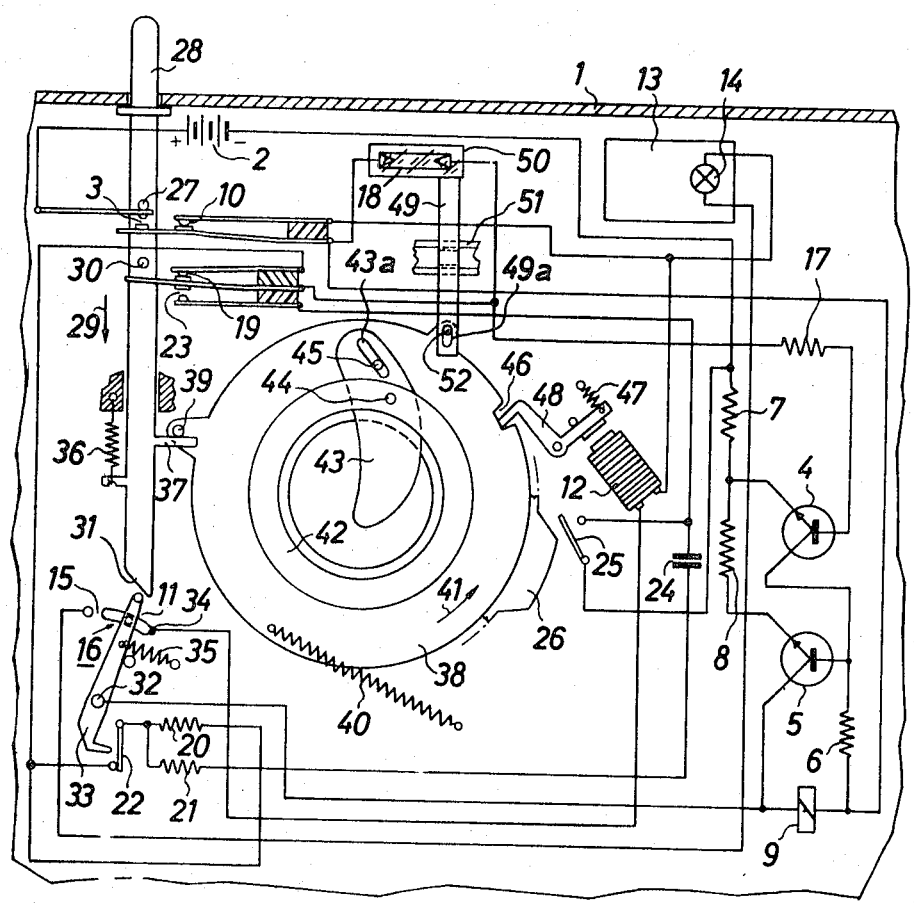
PATENTED FEB 15 1972
3,641,888
INVENTOR.
HELMUT DÜRR 3,641,888

PHOTOGRAPHIC APPARATUS WITH AUTOMATIC EXPOSURE CONTROL MEANS

BACKGROUND OF THE INVENTION

The present invention relates to photographic apparatus, and more particularly to improvements in automatic exposure controls for photographic apparatus. Still more particularly, the invention relates to improvements in exposure controls of the type wherein the electric circuit need not include a galvanometer.

German printed publication Ser. No. 1,76,437 discloses an exposure control wherein a signal-generating device becomes effective when the intensity of scene light is below a predetermined value to thus indicate that a satisfactory exposure cannot be made with the camera held by hand. The user then actuates a manually operable diaphragm setting member to increase the aperture size. It is also known to adjust the diaphragm by way of a galvanometer; however, such galvanometers are rather expensive, bulky and prone to malfunction.

SUMMARY OF THE INVENTION

An object of the invention is to provide a photographic apparatus, particularly a still camera, with an exposure control wherein the aperture size furnished by the diaphragm can be changed automatically as a function of scene brightness and wherein such changes can be effected by a circuit which need not include a galvanometer.

Another object of the invention is to provide an exposure control which enables the user of the camera to make automatic exposures with the camera held by hand at a wide range of scene brightnesses and which automatically informs the user that a tripod or a like support should be employed when the scene brightness is less than the lower limit of the aforementioned range.

A further object of the invention is to provide an exposure control which employs relatively simple and compact mechanical, electrical and electronic components.

An additional object of the invention is to provide an exposure control wherein the amount of scene light which can reach the photosensitive element or elements is changed automatically with changes in scene brightness.

The invention is embodied in a photographic camera which comprises adjustable diaphragm and shutter means respectively arranged to furnish a plurality of aperture sizes and exposure times, an exposure control circuit having an input portion, an output portion and including a source of direct current, timer means connectable with the input portion and including photosensitive receiver means exposed to scene light and capacitor means, relay means connected to the output portion of the control circuit and energizable to effect closing of the shutter means, signal generating means preferably including a lamp which is connectable with the output portion of the control circuit to furnish signals indicating scene light of a predetermined minimum intensity (preferably an intensity at which the exposure cannot be made with the camera held by hand), variable resistor means, electromagnet means in parallel with the relay means and energizable by the control circuit to effect an increase in the aperture size at a predetermined range of light intensities exceeding the aforementioned minimum intensity, and actuating means preferably including a camera release operative to connect the variable resistor means with the photosensitive receiver means instead of the capacitor means, to effect energization of the electromagnet means at the aforementioned range of light intensities, to connect the signal generating means with the output portion of the control circuit instead of the electromagnet means and to change the effective resistance of the variable resistor means by a value which is proportional to the increase in aperture size, and to thereupon effect opening of the shutter means. The shutter means remains open for a period of time determined by the timer means, i.e., by timing of energization of the relay means.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a schematic longitudinal vertical sectional view of a still camera including an exposure control which embodies the invention.

DESCRIPTION OF THE PREFERRED EMBODIMENTS

The drawing illustrates a portion of a still camera whose housing 1 accommodates a source 2 of DC current in an electronic control circuit which is completed in response to closing of a master switch 3. The control circuit comprises two transistors 4, 5 and its output is connected with an exposure time terminating relay 9. The collector of the transistor 4 is connected with the base of the transistor 5 and with a resistor 6 which latter is connected with one contact of the master switch 3. The emitter of the transistor 4 is connected with a tap between the resistors 7, 8 of a voltage divider which is connected with the emitter of the transistor 5. The relay 9 is connected with the collector of the transistor 5 and is in parallel with an electromagnet 12 whose winding is connected with one contact of a normally closed switch 10 and with the movable contact 11 of a first two-way switch 16. A signal lamp 14 is installed in the observation field of a viewfinder 13; the circuit of this lamp can be completed in response to movement of the contact 11 into engagement with a fixed contact 15 of the switch 16. The lamp 14 is then in parallel with the relay 9 in place of the electromagnet 12.

The base of the transistor 4 is connected with a second voltage divider which includes a resistor 17. This voltage divider further comprises a photosensitive receiver 18 (prior to setting of the exposure time) and a variable resistor composed of two series-connected resistors 20, 21 which are connected with the receiver 18 in response to actuation of a second two-way switch 19. A switch 22 can be closed to shunt the resistor 21.

The resistors 20, 21 can be replaced in the circuit with a capacitor 24 in response to closing of the lower switch element 23 of the two-way switch 19. The capacitor 24 can be shorted in response to closing of a switch 25. This switch 25 can be closed by the lobe or trip of a shutter ring 26.

The master switch 3 can be closed by a trip or pin 27 provided on a reciprocable actuating device 28 which constitutes the camera release. The latter further carries a second trip or pin 30 which can open the upper switch element and simultaneously close the lower switch element 23 of the switch 19. The lower end of the camera release 28 is provided with an inclined cam face 31 which can engage a follower on a lever 33 of the switch 16 to thereby move the contact 11 into engagement with the contact 15. The lever 33 is pivotable on a fixed pin 32 and is biased in a clockwise direction by a spring 35. The contact 11 engages an arcuate fixed contact 34 of the switch 16 when the spring 35 is free to hold the lever 33 in the illustrated position. The lever 33 conducts current and is electrically connected with the collector of the transistor 5. The pallet at the lower end of the lever 33 opens the switch 22 in response to downward movement of the camera release 28 (arrow 29). The latter is biased upwardly to starting position by a relatively strong return spring 36 and is provided with an extension or arm 37 which is engaged by a post 39 provided on a movable diaphragm setting ring 38 which is biased by a helical spring 40 tending to rotate it in the direction indicated by arrow 41. The bias of the spring 36 is stronger than that of the spring 40 so that the camera release 28 automatically moves the setting ring 38 to illustrated position when the spring 36 is free to contract. The spring 40 then stores energy and tends to rotate the ring 38 counterclockwise. The diaphragm further comprises a second or inner ring 42 having pivot pins 44 for a set of diaphragm vanes 43 (only one shown). Each vane 43 is further provided with an elongated slot 43a for a guide pin 45 on the movable setting ring 38. The latter is further provided with a notch 46 which can receive the tip of a two-armed blocking lever 48 constituting the armature of the electromagnet 12 and biased by a spring 47 so that it normally engages and holds the ring 38 in the illustrated position. When the electromagnet 12 is energized, the armature 48 is automatically disengaged from the ring 38 so that the latter can turn counterclockwise in response to action of the spring 40, provided that the camera release 28 is moved downwardly and away from the illustrated starting position.

The setting ring 38 is further coupled with a motion transmitting arm 49 which carries a grey filter 50 and has an elongated slot 49a for a pin 52 of the ring 38. The arm 49 is reciprocable in a guide 51 and maintains the filter 50 in front of the photosensitive receiver 18 when the setting ring 38 is engaged and held by the armature 48. The guide 51 insures that the arm 49 is confined to reciprocatory movement in response to angular movement of the setting ring 38.

The operation:

I. In the illustrated blocked position of the movable diaphragm setting ring 38, the vanes 43 define a relatively small aperture. It is assumed that the size of such aperture is satisfactory for exposures with the housing of the camera held by hand. If the user wishes to make an exposure, the camera release 28 is moved in the direction indicated by arrow 29 to stress the return spring 36 and to cause the trip 27 to close the master switch 3. The positive pole of the energy source 2 is then connected with the control circuit. The intensity of scene light is sufficient for making of an exposure with the housing 1 held by hand; therefore, the resistance of the photosensitive receiver 18 is low and the potential at the base of the transistor 4 is positive with reference to that at the emitter of this transistor. The transistor 4 conducts but the transistor 5 blocks the flow of current. The electromagnet 12 cannot be energized and its armature 48 maintains the movable diaphragm setting ring 38 in the illustrated position. Also, the grey filter 50 remains in front of the photosensitive receiver 18.

As the camera release 28 continues to move in the direction indicated by arrow 29, the trip 27 opens the normally closed switch 10 (by way of the master switch 3) and the trip 30 closes the element 23 of the two-way switch 19. The switch element 23 connects the capacitor 24 in series with the photosensitive receiver 18 while the other switch element of the switch 19 disconnects the variable resistor including the resistors 20, 21.

The shutter ring 26 is moved to cocked position (in a counterclockwise direction, as viewed in the drawing) in response to depression of the camera release 28 or in response to actuation of the film-transporting mechanism (not shown) prior to depression of the release. Such cocking causes the lobe of the shutter ring 26 to close the switch 25 and to shunt the capacitor 24.

When the camera release 28 reaches the fully depressed (operative) position, the shutter ring 26 is released and turns counter to the direction indicated by the arrow 41 (under the action of a spring which is not shown in the drawing) to permit opening of the switch 25. The charging of capacitor 24 begins in response to opening of the switch 25 and the transistor 4 begins to block the flow of current with a delay which is determined by the time constant of the capacitor 24 and by scene brightness (photosensitive receiver 18). The relay 9 is energized in response to blocking of current flow by the transistor 4 and effects closing of the shutter to complete the exposure. Thus, the exposure is made with an aperture of relatively small size (because the diaphragm setting ring 38 is blocked by the armature 48 of the deenergized electromagnet 12) and with an exposure time which is a function of scene brightness determined by the timer including the receiver 18 (which controls the timing of energization of the relay 9) and the capacitor 24.

II. It is now assumed that the user wishes to make an exposure when the scene brightness is insufficient for making of exposures with the housing 1 held by hand while the vanes 43 define a relatively small aperture (with the ring 38 blocked by the armature 48) but that the scene brightness is satisfactory for making of exposures with an aperture of larger size. As the user moves the camera release 28 in the direction indicated by arrow 29, the trip 27 closes the master switch 3. The resistance of the receiver 18 is so high that the potential at the base of the transistor 4 is negative with reference to potential at the emitter so that the transistor 4 blocks the flow of current. Thus, the potential at the base of the transistor 5 is positive with reference to the emitter potential and the transistor 5 conducts current to effect energization of the electromagnet 12. The relay 9 is also energized but without any immediate effect. The energized electromagnet 12 attracts the armature 48 against the opposition of the spring 47 so that the diaphragm setting ring 38 is released and can turn (arrow 41) under the action of the spring 40 to the extent determined by the position of the arm 37.

The camera release 28 continues to move downwardly and the cam face 31 pivots the lever 33 in a counterclockwise direction to move the contact 11 along the contact 34. When the contact 11 moves away from the contact 34, the switch 16 opens the circuit of the electromagnet 12 so that the armature 48 pivots under the action of the spring 47 to engage the peripheral surface of the setting ring 38 (the notch 46 is out of registry with the pallet of the armature 48 because the ring 38 has moved in a counterclockwise direction under the action of the spring 40).

Pivoting of the lever 33 causes opening of the switch 22 so that the resistor 21 is connected with the resistor 20. This causes a change in the condition of the transistor 4; the potential at its base becomes positive so that the transistor 4 permits and the transistor 5 blocks the flow of current. When the movable contact 11 engages the fixed contact 15 of the two-way switch 16, the signal lamp 14 is connected into the collector circuit of the transistor 5. However, the lamp 14 does not produce a visible signal because the transistor 5 blocks the flow of current. The camera release 28 continues to move in the direction indicated by arrow 29 whereby the trip 27 opens the switch 10 by way of the master switch 3 so that the switch 10 opens the circuit of the signal lamp 14 and transistor 5. The setting ring 38 continues to turn (arrow 41) under the action of the spring 40 whereby the vanes 43 define an aperture whose size increases in response to downward movement of the camera release 28.

The resistors 20, 21 are disconnected and the charging of capacitor 24 takes place in the same way as described above. The rotating setting ring 38 causes the filter 50 to move away from registry with the receiver 18. The exposure is made with a predetermined (large) aperture size and with an exposure time which is determined by the scene brightness (as detected by the receiver 18 which is rendered more sensitive in response to movement of the filter 50 as a result of counterclockwise rotation of the setting ring 38).

III. If the scene brightness is such that the exposure cannot be made with the camera held by hand, even if the diaphragm vanes 43 define an aperture of maximum size, depression of the camera release 28 produces the same results as in the just described second example excepting that the resistance of the receiver 18 is much higher. Thus, when the camera release 28 causes the lever 33 to open the switch 22 and to connect the resistor 20 with the resistor 21, the resistance of the receiver 18 is so high that the base potential of the transistor 4 is negative with reference to the emitter potential. Consequently, the transistor 4 blocks the flow of current, the transistor 5 conducts, and the lamp 14 furnishes a visible signal in response to movement of the contact 11 into engagement with the contact 15 of the switch 16. Such signal informs the user that the scene brightness is unsatisfactory for exposures with the camera held by hand The user then simply terminates the finger pressure upon the camera release 28 whereby the spring 36 automatically returns the movable parts to their illustrated positions. The circuit opens in response to opening of the master switch 3.

It will be seen that the input of the electronic control circuit is connectable with a timer including the photosensitive receiver 18 and capacitor 24, and that the output of this control circuit is connected with the relay 9 which terminates the exposure. The timer 18, 24 determines the exposure time. The output of the control circuit is connected with the signal lamp 14 which lights up only when the scene brightness is unsatisfactory for making of exposures with the camera held by hand. The diaphragm defines a smaller aperture when the intensity of scene light is high and a larger aperture when the intensity of scene light is low.

An important advantage of the electromagnet 12 is that it effects an automatic increase in aperture size when the intensity of scene light is below a first range which permits the making of exposures with a small aperture size and with the camera held by hand, but above a minimum value at which the lamp 14 produces a signal to indicate that the camera should be mounted on a tripod. The lamp 14 can produce a signal when the resistance of the variable resistor including the resistor 20, 21 is such that the transistor 4 blocks the flow of current even if it is fully exposed to scene light (i.e., when the filter 50 is moved away from the illustrated position). This filter constitutes one form of an auxiliary diaphragm which determines the amount of scene light reaching the receiver 18.

If desired, the structure shown in the drawing can be modified by mounting the switch 22 in such a way that it is opened and closed in response to changes in energization of the electromagnet 12. It is further clear that the lamp 14 can be replaced with another suitable signal generating device, for example, with an electromagnet which blocks further movement of the camera release 28 from starting position to thereby indicate that the scene brightness is unsatisfactory for making of exposures with the camera held by hand.

The filter 50 (or an analogous auxiliary diaphragm) influences the exposure time in response to an increase in the aperture size, i.e., in response to energization of the electromagnet 12 which thereupon permits the spring 40 to rotate the setting member 38 from the illustrated position corresponding to the smaller aperture size. The arrangement is such that the exposure time is longer when the filter 50 is located in front of the receiver 18.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. In a photographic apparatus, a combination comprising adjustable diaphragm and shutter means respectively arranged to furnish a plurality of aperture sizes and exposure times; a control circuit including a source of direct current and having an input portion and an output portion; time means connectable with said input portion and including photosensitive receiver means exposed to scene light and capacitor means; relay means connected to said output portion and energizable to effect closing of said shutter means; signal generating means connectable with said output portion to furnish signals indicating scene light of a predetermined minimum intensity; variable resistor means; electromagnet means in parallel with said relay means and energizable by said circuit to effect an increase in the aperture size at a predetermined range of light intensities exceeding said minimum intensity; and actuating means operative to connect said variable resistor means with said receiver means in place of said capacitor means, to effect energization of said electromagnet means at said range of light intensities, to connect said signal generating means with said output portion in place of said electromagnet means and to change the resistance of said resistor means, and to thereupon effect opening of said shutter means.

2. A combination as defined in claim 1, wherein said actuating means comprises a camera release movable to and from a starting position.

3. A combination as defined in claim 2, further comprising switch means actuatable by said release in response to movement from said starting position to thereby disconnect said electromagnet means from said relay means.

4. A combination as defined in claim 1, wherein said variable resistor means comprises two resistors and further comprising switch means movable by said actuating means between two positions in one of which said resistors are connected in series.

5. A combination as defined in claim 4, wherein said actuating means comprises a camera release movable to and from a starting position and further comprising second switch means, actuatable by said release simultaneously with said first-mentioned switch means in response to movement of said release from starting position, to thereby disconnect said electromagnet means from said relay means.

6. A combination as defined in claim 1, wherein said variable resistor means comprises two resistors and further comprising switch means movable by said electromagnet means between two positions in one of which said resistors are connected in series.

7. A combination as defined in claim 1, wherein said signal-generating means comprises a lamp.

8. A combination as defined in claim 1, wherein said input and output portions of said control circuit respectively comprise a first and a second transistor and wherein said receiver means and said variable resistor means constitute a voltage divider which is connected by said actuating means to the base of said first transistor prior to opening of said shutter means.

9. A combination as defined in claim 1, wherein said diaphragm means comprises an adjustable setting member and auxiliary diaphragm means operatively connected with said setting member and arranged to reduce the amount of scene light reaching said receiver means when the intensity of such light exceeds said range.

10. A combination as defined in claim 9, wherein said auxiliary diaphragm means comprises a grey filter.

11. A combination as defined in claim 9, wherein said setting member is movable on operation of said actuating means to increase the aperture size and to increase the amount of scene light reaching said receiver means following energization of said electromagnet means.

12. A combination as defined in claim 1, further comprising master switch means arranged to complete said control circuit in response to movement of said actuating means from a predetermined starting position.

* * * * *